RELUCTANCE-TYPE TRANSDUCER DEVICE

Filed Aug. 12, 1963

INVENTOR
DOUGLAS. H. HARRIS
BY Louis A Kline
John J. Callahan
HIS ATTORNEYS 3,423,742
Patented Jan. 21, 1969

3,423,742

RELUCTANCE-TYPE TRANSDUCER DEVICE

Douglas H. Harris, Kettering, Ohio, assignor to The National Cash Register Company, Dayton, Ohio, a corporation of Maryland Filed Aug. 12, 1963, Ser. No. 301,420
U.S. Cl. 340—174.1 2 Claims
Int. Cl. G11b 5/00

This invention relates to magnetic transducers and more particularly to a reading head device for developing an electrical wave shape characteristic of magnetic symbols carried on a non-magnetic background material.

In more recent data-processing systems, it has become desirable to enter information by the direct reading of printed characters. One known system reads human language which is printed on documents as symbols in ink capable of being magnetized. The symbols are magnetized. The symbols are magnetized and translated in sequence past a transducer adapted to generate a distinctive electrical wave shape for each symbol. The transducer is responsive to the passing magnetized symbols and delivers an output signal corresponding to the areas and flux densities of the magnetized symbols.

Electromagnetic reading heads have been used for data-processing applications since the beginning days of the art. The retrieval of information from magnetic-oxide-coated tape is the most common application. An electromagnetic read head used for digital or analog systems operates in most cases by sensing a flux directional change which has been developed on magnetic media by an electromagnetic write head. In these cases, data is registered on a continuous magnetic media.

Direct-current reluctance type read heads are less common in data-processing systems utilizing continuous magnetic media requiring scanning of the magnetic media. Generally, reluctance type read heads find more application in the sensing of the presence of magnetic material on a non-magnetic carrier. In this latter application, the read heads are constructed with additional windings for their direct-current bias, and the bias supply generally comprises a low impedance source. This low impedance source is reflected as a severe loading on the output windings on the read head, resulting in loss of high-frequency response. For this reason, the reluctance read heads of the prior art are normally used in triggering and digital applications and find little use in analog applications.

In accordance with the present invention, there is provided a transducer device comprising a transducer head, including a core of magnetic material having a pair of spaced pole portions defining a non-magnetic gap, and a coil mounted on the core, and a high impedance unidirectional current source for energizing the coil.

In accordance with a more specific aspect of the present invention, there is provided a transducer device for developing electrical wave shapes characteristic of different magnetic characters carried by a document, comprising an electromagnetic transducer head including a core having a pair of spaced pole portions defining a non-magnetic gap and a reading coil including a pair of windings having opposite magnetic orientation, each winding being mounted on one of the pole portions, with the core, the pole portions, and the gap forming a series magnetic circuit through the pair of windings, and a high impedance constant unidirectional current source connected across the reading coil for producing a stable magnetic flux condition in the magnetic circuit whereby, when the document is moved relative to the head, the magnetic characters thereon cause the reluctance of the magnetic circuit to vary, thereby developing in the reading coil electrical wave shapes characteristic of the characters.

The electromagnetic transducer head utilized in the present invention may take the form of the read head used to generate a distinctive electrical wave shape for each magnetized character translated past it. The wave shape generated by the read head represents the magnetized character and is dependent on the character's physical shape and the remanent flux density developed therein by magnetization thereof by a permanent magnet write head, for example.

In accordance with the present invention, the same read head useful for the purpose stated above is transformed from a magnetic field detecting device to a reluctance-operated device by the provision of a high impedance direct-current source connected across the output and only windings of the read head. The direct-current bias source is regulated to maintain a constant magnetic flux condition within the pole portions of the read head. Its magnetic operating point is in the linear portion of the magnetization characteristics of the pole portions at the region of the non-magnetic gap. The impedance of the current source is high to prevent additional significant loading of the read head windings and resulting signal distortion.

The wave shapes generated by the transducer device of the present invention have been found to be identical in structure and harmonic or spectral content with those wave shapes generated by the aforementioned magnetic field transducer device. However, the wave forms generated are now dependent on the physical shape and dimensions of the magnetic characters and not the remanant flux of magnetized characters. As the magnetic character is translated across the read head gap, the reluctance of the gap changes with character area, thus varying the effective reluctance of the core.

The gain realized from the transducer device of the present invention is dependent on the magnitude of the maximum flux saturation density of the magnetic character material. This saturation density has been found to be several magnitudes greater than the remanent flux density of the magnetized character material, effecting a signal amplitude increase that is proportional.

When magnetized characters are read with the use of a magnetic field transducer device, noise may prevail in the system, originating from magnetic sources such as the magnetizer head. Since conversion of the read head to a reluctance device does not alter the $d\phi/dt$ value of this noise, the signal to induced noise ratio is increased by a magnitude equal to the voltage gain.

It is therefore an object of the present invention to provide an improved transducer device for obtaining electrical wave shapes which are characteristic of magnetic characters.

Another object of the invention is to provide a transducer device with increased signal amplitude on its output winding.

Still another object of the invention is to provide a transducer device with increased signal-to-noise ratio at its output.

A further object of the invention is to provide a transducer device with means for standardizing output signal levels which are solely dependent on the magnetic ink density of the magnetic characters read thereby.

A still further object of the invention is to provide a transducer device for reading magnetic characters which eliminates the need for magnetizing such characters prior to the reading thereof.

Still another object of the invention is to provide a transducer device with one set of windings used for both direct current energization and signal detection.

Other objects of the invention will be pointed out in the following description and claims and illustrated in the accompanying drawing, which discloses, by way of example, the principle of the invention and the best mode which has been contemplated of applying that principle.

Figure 1:
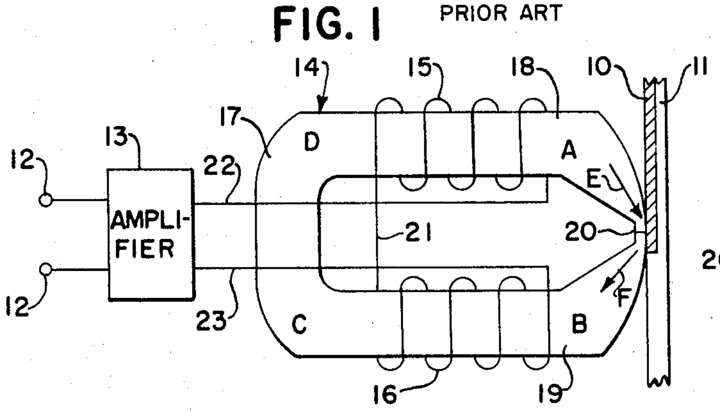
FIG. 1 PRIOR ART
FIGURE 1 is a schematic diagram of a prior-art transducer device.

Referring now to FIGURE 1, a conventional electromagnetic transducer device for generating a distinctive electrical wave shape for each magnetized symbol carried by a document is shown. This transducer device is responsive to the magnetized symbol at 10 carried by a document 11 and delivers at the output terminals 12—12 of an amplifier 13 an output signal or wave shape corresponding to the area and flux density of the magnetized symbol. The transducer device comprises a transducer head which includes a core 14 and a pair of signal coils 15 and 16. The core 14 includes a back portion 17, and two side portions 18 and 19, which define an air gap 20, across which the document 11 is arranged to pass. The two coils 15 and 16 are wound in opposite directions and are serially connected by a conductor 21, the opposite ends of the coils being connected through conductors 22 and 23 to the amplifier 13.

Figure 2:
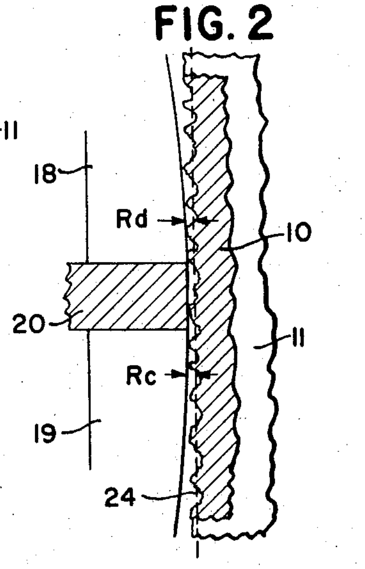
FIGURE 2 is a diagram useful in explaining the operation of the transducer device of FIGURE 1.

The operation of the transducer device of FIGURE 1 is now explained. The document 11, carrying magnetized symbols, is translated past the air gap 20 of the transducer head. The fringe flux of a magnetized symbol traces the path FBCDE, which is lower in reluctance than the normal path in free space. A resulting flux or $d\phi/dt$ induced in the transducer head as a result of sensing the magnetic symbol induces in the signal coils 15 and 16 an alternating current voltage which is amplified by the amplifier 13. An analysis concerning the efficiency of this transducer device is best explained by referring to FIGURE 2. Both the document 11 and the magnetic symbols carried thereby have a rough surface which creates a mean effective spacing 24 between the symbols and the pole piece gap region. Regardless of holding force against the transducer head, this spacing cannot be reduced to zero tolerance and has the associated reluctances $Rd$ and $Rc$. Therefore, the effective flux density within the core 14 of the transducer head is some constant K times the remanent flux of the magnetized symbol. The constant K is a function of the reluctances $Rd$ and $Rc$ and is always less than one.

Figure 3:
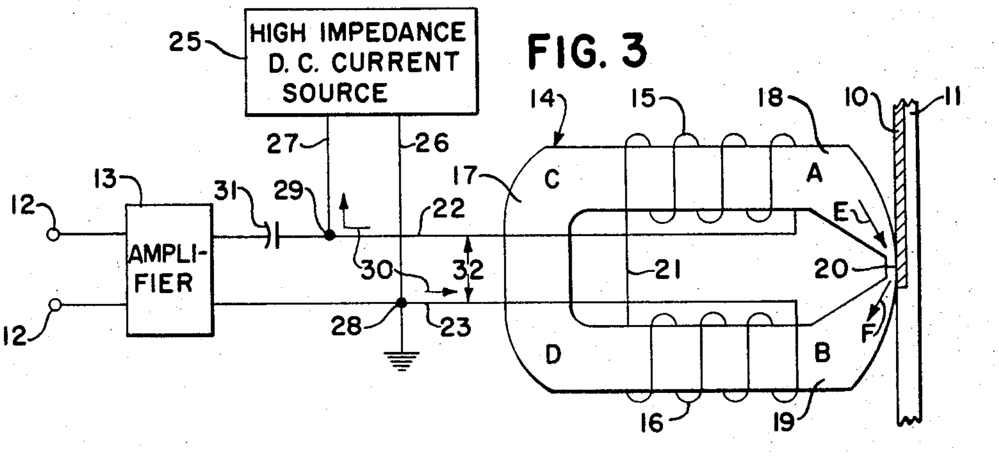
FIGURE 3 is a schematic diagram of the transducer device of the present invention.

Referring now to the form of the invention illustrated in FIGURE 3 of the drawing, the transducer device is similar to that of FIGURE 1 except that a high impedance direct current source 25 is connected by means of conductors 26 and 27 across the output reading coil 32 (which includes the windings 15 and 16) at points 28 and 29 on the output conductors 22 and 23. The current source 25 supplies current flow in the direction 30 through the windings 15 and 16. This causes a steady state or stable flux condition to exist in path AEFBDC of the core 14. The document 11 with magnetic symbols passes adjacent to the gap 20 of the transducer head and reduces the total reluctance of the path AEFBDC. The decrease in reluctance occurs at the non-magnetic gap 20 as it is magnetically shunted by a magnetic symbol. The amount of this decrease in reluctance is directly proportional to the total area of the magnetic symbol which is across the gap 20. The result of this action is a proportional increase in the flux developed by the energizing current from the source 25 effecting a $d\phi/dt$ alternating current output across the read head coils 15 and 16. The alternating current voltage is impressed on the direct current voltage resulting from the D.C. energizing current and the D.C. resistance of the coils 15 and 16.

The transducer head is coupled via capacitor 31 to the amplifier 13 for amplifying the desired A.C. signal. The constant K does not change value when this transducer device is utilized. However, the effective flux is now supplied by the current source 25, and its maximum density value is the saturation density of the magnetic symbols. This value is approximately three times that of the remanent flux density, which offers an overall signal gain of three for the D.C. reluctance transducer device of this invention.

The increased efficiency of applicant's transducer device in the form of higher gain and greater signal-to-noise ratio is made possible by utilizing the saturation density of the magnetic symbols. A significant advantage is the adaptability of this invention to any read head by the addition thereto of a suitable high impedance current source.

Figure 4:
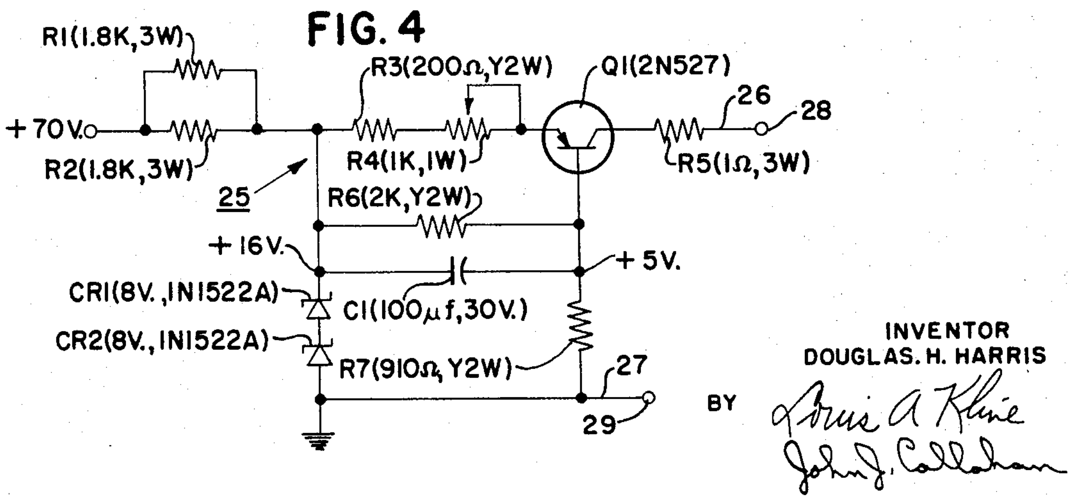
FIGURE 4 is a schematic circuit diagram of the high impedance direct current source shown in block form in FIGURE 3.

FIGURE 4 is a schematic circuit diagram of a current source suitable for the high impedance D.C. source 25. It provides a high impedance source of current controllable from ten to fifty milliamperes. The impedance of this current source is large compared with the other impedances of the circuit, so as not to change the frequency response characteristics of the transducer device.

The +70-volt power supply is reduced to +16 volts and is regulated by the use of the resistors R1 and R2 and the Zener diodes CR1 and CR2. The transistor Q1 operates in the grounded base mode. The base voltage is set at +5.2 volts by the resistance divider including the resistors R6 and R7. The current through the transistor Q1 is controlled by the resistor R4, with the upper limit set by the resistor R3. Noise and ripple from the +70-volt power supply are reduced by use of the capacitor C1. The resistor R5 is provided as a means of current measurement at the output of the circuit.

The output specifications for the FIGURE 4 circuit are as follows:

Output current: adjustable (10 to 50 milliamperes);
Output current variation for ±5% variation of Input+70-volt supply: 0 to 2 cycles per second=±0.12%;
Output voltage: 0 to +5.0 volts;
Output impedance for 40 milliamperes and 55 degrees centigrade ambient temperature: 50 K. minimum to 100 K. maximum;

The output impedance varies in about inverse proportion to the output current.

The power requirements for the FIGURE 4 circuit are as follows: +70 volts ±5%, 60 milliamperes, with a total power dissipation of 4.2 watts.

What is claimed is:

1. A transducer circuit device for developing electrical wave shapes characteristic of different magnetic characters carried by a document, comprising:

an electromagnetic transducer head including a core having a pair of spaced pole portions defining a non-magnetic gap, and a reading coil including a pair of windings having opposite magnetic orientation, each winding being mounted on one of said pole portions, said core, said pole portions, and said gap forming a series magnetic circuit through said pair of windings;

and a high impedance unidirectional current source connected in parallel with said reading coil for producing a stable magnetic flux condition in said magnetic circuit, said current source having a high output impedance which varies in substantially inverse proportion to its output current and which is greater than any other impedance in said transducer circuit device so as not to change the frequency response characteristics of said transducer circuit device by loading of said reading coil, whereby when said document is moved relative to said head, said magnetic characters cause the reluctance of said magnetic circuit to vary, thereby developing in said reading coil electrical wave shapes characteristic of said characters.

2. A transducer circuit device for developing electrical wave shapes characteristic of different magnetic characters carried by a document, comprising:

an electromagnetic transducer head including a core having a pair of spaced confronting pole portions defining a non-magnetic gap, and a reading coil including a winding wound on said core, and a high impedance unidirectional current source connected in parallel with said reading coil for producing a stable magnetic flux condition in said core and said pole portions, said current source having a high output impedance which varies in substantially inverse proportion to its output current and which is greater than any other impedance in said transducer circuit device so as not to change the frequency response characteristics of said transducer circuit device by loading of said reading coil, whereby when said document is moved relative to said head, said magnetic characters cause the reluctance of said transducer head to vary, thereby developing in said reading coil electrical wave shapes characteristic of said characters.

References Cited

UNITED STATES PATENTS

| | | | |
|---|---|---|---|
| 3,016,427 | 1/1962 | Grant | 179—100.2 |
| 3,106,617 | 10/1963 | Fox | 179—100.2 |
| 2,785,233 | 3/1957 | Stuart | 179—100.2 |
| 3,295,118 | 12/1966 | Brown | 179—100.2 |

STANLEY M. URYNOWICZ, Jr., *Primary Examiner.*

V. P. CANNEY, *Assistant Examiner*

U.S. Cl. X.R.

179—100.2